United States Patent [19]
Chen

[11] Patent Number: 5,568,958
[45] Date of Patent: Oct. 29, 1996

[54] SEAT ADJUSTING DEVICE

[75] Inventor: Chao-hu Chen, Taichung Hsien, Taiwan

[73] Assignee: Kalloy Industrial Co., Ltd., Taichung Hsien, Taiwan

[21] Appl. No.: 568,538

[22] Filed: Dec. 7, 1995

[51] Int. Cl.[6] ........................................ B60J 1/00
[52] U.S. Cl. .................. 297/215.15; 297/195.1; 297/215.14; 403/396; 403/389
[58] Field of Search ............................ 297/195.1, 215.13, 297/215.14, 215.15; 403/389, 396, 61, 65, 84; 248/219.2

[56] References Cited

U.S. PATENT DOCUMENTS

| 503,411 | 8/1893 | Field | 248/292.2 |
|---|---|---|---|
| 4,950,004 | 8/1990 | Sunshine | 297/195.1 |
| 5,364,160 | 11/1994 | Fritschen et al. | 297/215.14 |

FOREIGN PATENT DOCUMENTS

| 0607186 | 8/1960 | Italy | 297/215.15 |
|---|---|---|---|

*Primary Examiner*—Peter M. Cuomo
*Assistant Examiner*—Anthony D. Barfield
*Attorney, Agent, or Firm*—Ralph F. Crandell

[57] ABSTRACT

A seat adjusting device is disposed on a seat post which has a rounded top and has a third hole and a second slot respectively and transversely defined therein, a base having an upper part and two plates extending from the upper part, each of the two plates having a first hole and a first slot defined therein so as to receive the rounded top of the seat post between the two plates wherein the first slot and the second slot have an opposite slope with each other so as to define an overlap portion, a pin extending through the first hole and the third hole, a first bolt extending through the overlap portion of the first and the slots and engaging to a nut, a mounting element mounting to the upper part and being securely engaged to the upper part by a second bolt engaging therebetween.

2 Claims, 5 Drawing Sheets

SEAT ADJUSTING DEVICE

BACKGROUND OF THE INVENTION

The present invention relates to a seat adjusting device and more particularly, to a seat adjusting device on a seat post of a bicycle for adjusting an angle of the seat corresponding to an axis of the seat post.

FIG. 1 shows a conventional seat post 50 which has a support 52 extending laterally from an upper end thereof and an engaging device is disposed on the support 52, the support 52 having a first hole (not shown) defined therein. The engaging device includes a lower part 54, an upper part 56 and a bolt 58, each of the lower and upper parts 54, 56 having a hole defined therein respectively such that the bolt 58 extends through the first hole of the support 52 and the two holes of the lower and the upper parts 54, 56 and engaging to a plate 59 to secure the two parts 54, 56 to the support 52. The upper part 56 has a semi-circular recess 561 respectively defined in an under side of each one of two sides thereof and the lower part 54 has a semi-circular recess 541 defined in an upper side of each one of two sides thereof such that each corresponding pair of semi-circular recesses 561, 541 define a passage between the upper and the lower parts 56, 54 for a rod of a seat (not shown) extending therethrough.

Such an engaging device cannot provide a feature of easily and conveniently adjusting an angle of the seat corresponding to the seat post, but a rider needs to easily adjust a position or the angle of the seat depending on his/her bodily form so as to comfortably sit on the seat, therefore, there has been a long and unfulfilled need for a convenient adjusting device on the seat post so as to mitigate and/or obviate the above-mentioned problem.

SUMMARY OF THE INVENTION

The present invention provides a seat adjusting device on a seat post, the seat post having a rounded top and having a third hole and a second slot respectively and transversely defined therein. A base has an upper part and two plates extending from the upper part, each of the two plates having a first hole and a first slot defined therein so as to receive the rounded top of the seat post between the two plates wherein the first slot and the second slot have an opposite slope with each other so as to define an overlap portion. A pin extends through the first hole and the third hole, a first bolt extending through the overlap portion of the first and the second slots and engaging to a nut. A mounting element is mounted to the upper part and is securely engaged to the upper part by a second bolt engaging therebetween.

It is an object of the present invention to provide a seat adjusting device by which the seat can be adjusted according to a need of a rider.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
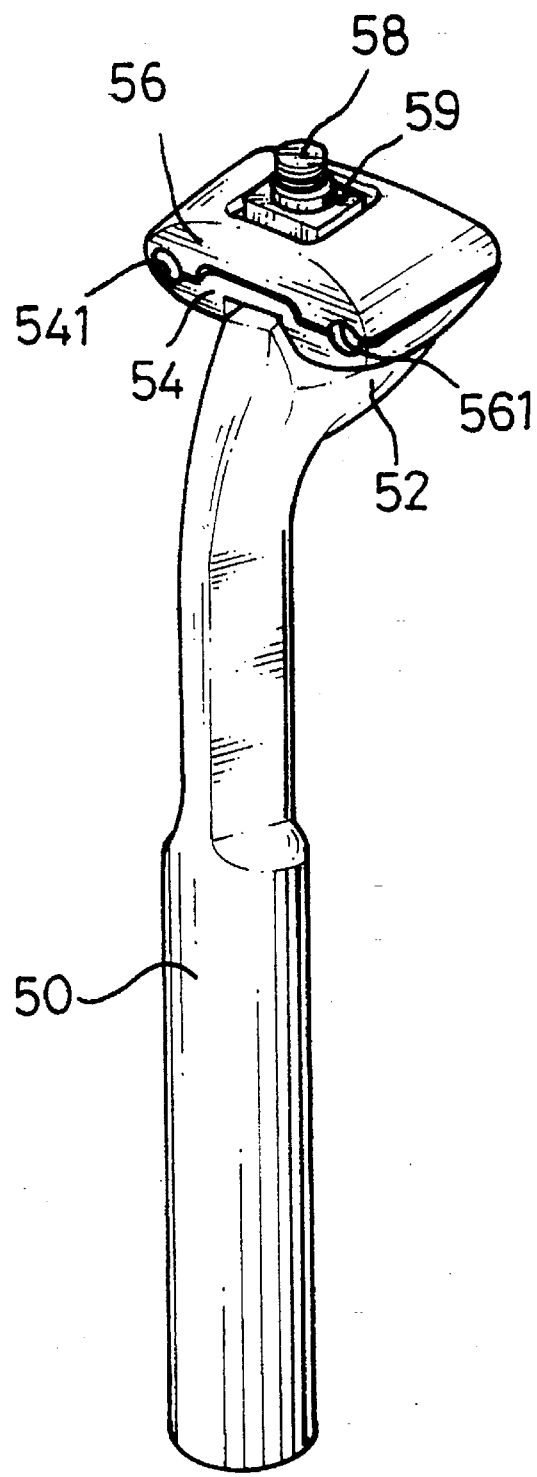
FIG. 1 is a perspective view of a conventional seat post with an engaging device disposed thereto.
Figure 2:
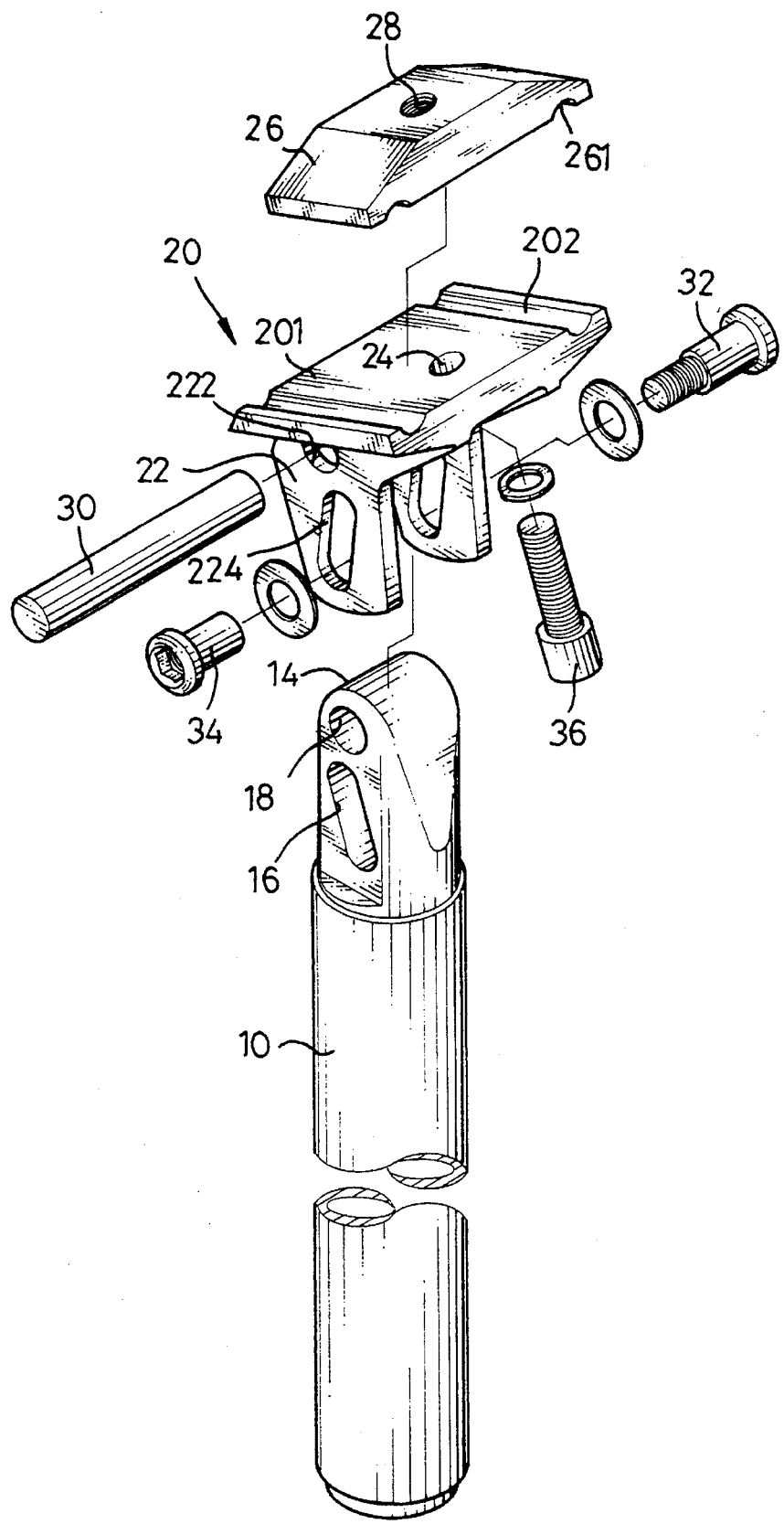
FIG. 2 is an exploded view of a seat adjusting device in accordance with the present invention.
Figure 3:
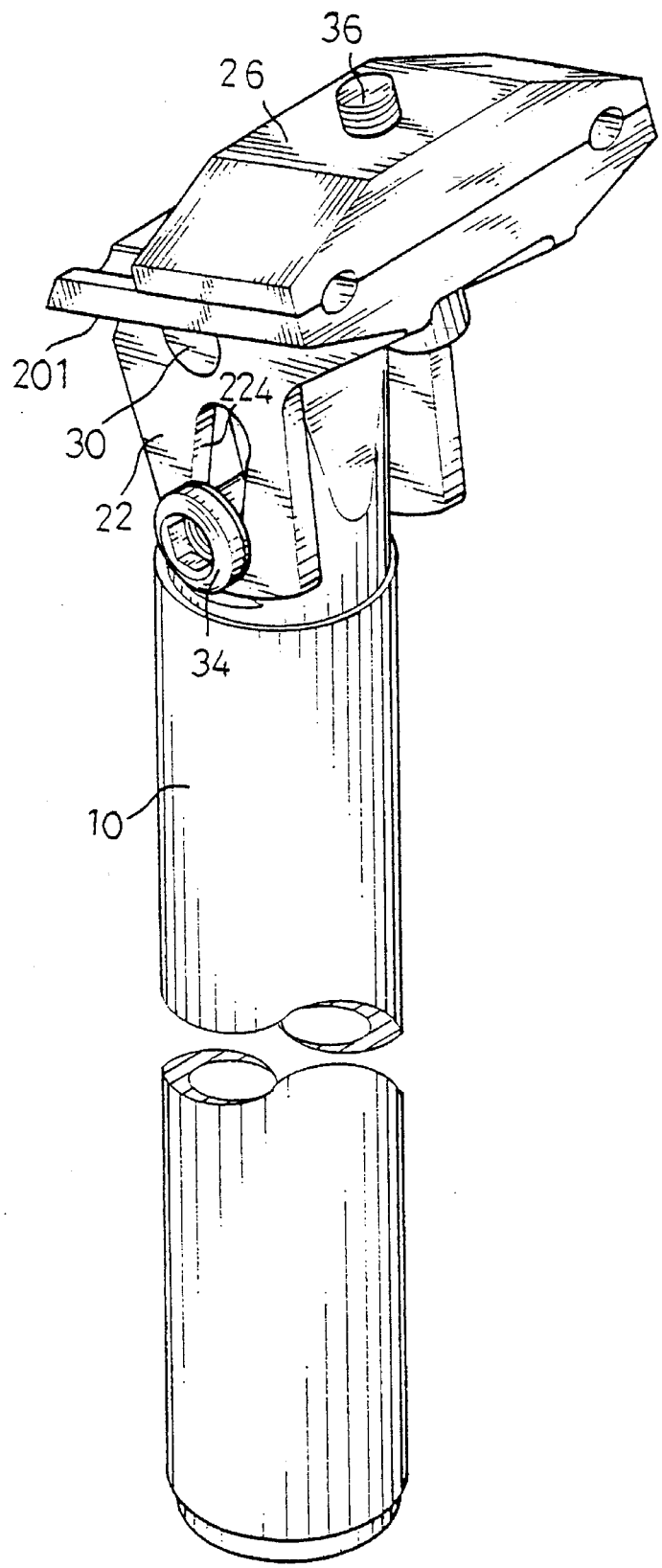
FIG. 3 is a perspective view of the seat adjusting device disposed to a seat post in accordance with the present invention.

Referring to the drawings and initially to FIGS. 2 through 4, a seat adjusting device in accordance with the present invention generally includes a base 20 having an upper part 201 and two plates 22 extending from an under side of the upper part 201, the two plates 22 extending in parallel with each other and each of the two plates 22 having a first hole 222 defined therein and a first slot 224 defined below the first hole 222. The upper part 201 has a second hole 24 defined therein and a first semi-circular recess 202 defined in each one of two sides of an upper surface thereof.

A mounting element 26 has a threaded hole 28 defined therein and has a second semi-circular recess 261 defined in each one of two sides of an under surface thereof.

A seat post 10 has a first end and a second end, the first end thereof having a rounded top 14 and a third hole 18 and a second slot 16 respectively and transversely defined therein. The second slot 16 is located below the third hole 18 and, the first slot 224 of each one of the plates 22 and the corresponding second slot 16 having an opposite slope with each other corresponding to an axis of the seat post 10

When assembling the seat adjusting device, the base 20 is mounted to the rounded top 14 of the seat post 10 and the first hole 222 and the third hole 18 are in alignment with each other for a pin 30 extending therethrough. Wherein the third hole 18 is sized such that the pin 30 is securely engaged therethrough. The first and the second slots 224, 16 forms an overlap portion 226 when the rounded top 14 of the seat post 10 is received between the two plates 22, a first bolt 32 extending through the overlap portion 226 and engaging to a nut 34 to securely position the base 20 corresponding to the seat post 10. The mounting element 26 mounts to the upper part 201 of the base 20 and is securely engaged to the base 20 by extending a second bolt 36 through the second hole 24 of the upper part 201 and to threadedly engage with the threaded hole 28 of the mounting element 26. Each pair of first and second semi-circular recesses 202, 261 define a passage between the mounting element 26 and the upper part 201 so as to allow rails of a seat (not shown) to extend therethrough.

Figure 4:
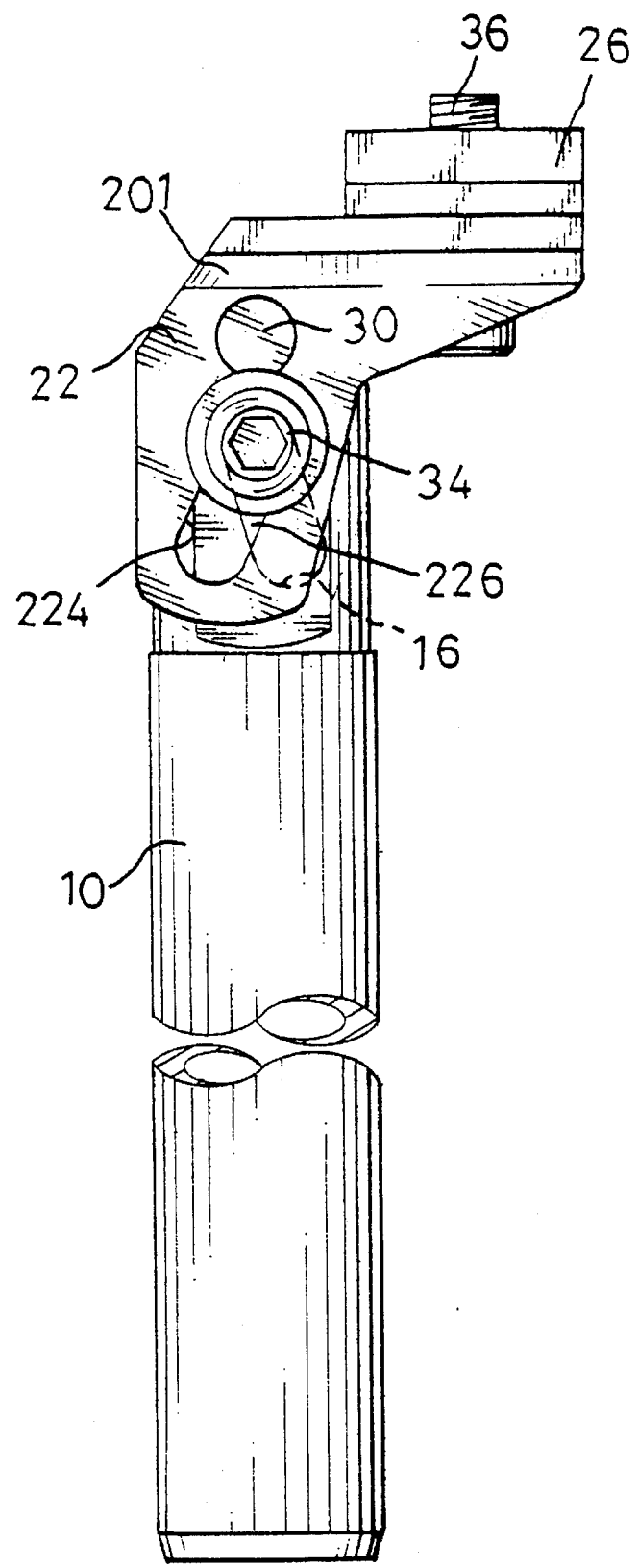
FIG. 4 is a side elevational view of the seat adjusting device wherein a base is located in a lowest position.
Figure 5:
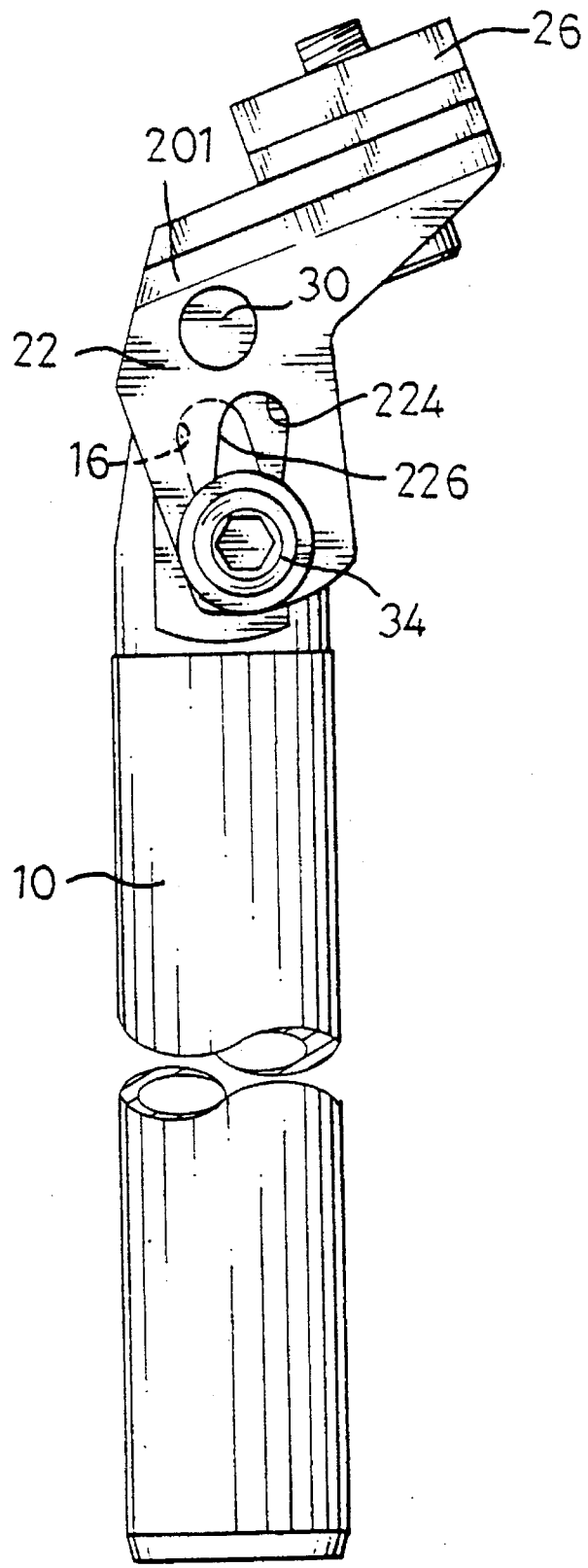
FIG. 5 is a side elevational view of the seat adjusting device wherein the base is adjusted to locate in an highest position.

Referring now to FIGS. 4 and 5, when adjusting the seat, the first bolt 32 is released then the base 20 can be rotated about an axis of the pin 30 to adjust an angle corresponding to the axis of the seat post 10, also, the base 20 can be moved along the first slot 224 or the second slot 16 under a condition that the first bolt 32 extends through the overlap portion 226. Therefore, the seat mounted to the base 20 and the mounting element 26 can be adjusted a position and the angle corresponding to the axis of the seat post 10.

Although the invention has been explained in relation to its preferred embodiment, it is to be understood that many other possible modifications and variations can be made without departing from the spirit and scope of the invention as hereinafter claimed.

What is claimed is:

1. A seat adjusting device comprising:

a base having an upper part and two plates extending from an under side of said upper part, said two plates extending in parallel with each other and each of said two plates having a first hole defined therein and a first slot defined below said first hole, said upper part having a second hole defined therein and having a first semi-circular recess defined in each one of two sides of an upper surface thereof;

a mounting element having a threaded periphery defining a hole therein and having a second semi-circular recess defined in each one of two sides of an under surface thereof;

a seat post having a first end and a second end, said first end thereof having a rounded top and having a third hole and a second slot transversely and respectively defined therein, said second slot located below said third hole, said first slot and said second slot having an opposite slope with each other corresponding to an axis of the seat post; and said base mounted to said rounded top of said seat post and said first hole and said third hole being in alignment with each other for a pin extending therethrough, said first and said second slots forming an overlap portion when said base is mounted to said rounded top, a first bolt extending through said overlap portion to engage to a nut to securely position said base corresponding to said seat post, said mounting element mounting to said upper part of said base and being securely engaged to said base by extending a second bolt through said second hole of said upper part and threadedly engaged with said threaded hole of said mounting element.

2. The seat adjusting device as claimed in claim 1 wherein said third hole of said seat post is sized that said pin is securely engaged therethrough.

* * * * *